(No Model.)

J. T. BELL.
HARROW DISK.

No. 409,818. Patented Aug. 27, 1889.

Witnesses
Chas. E. Gorton
Lenard Vassall

Inventor
John T. Bell.
By his Attorney
Joseph G. Parkinson

UNITED STATES PATENT OFFICE.

JOHN T. BELL, OF DAYTON, OHIO, ASSIGNOR TO THE OHIO RAKE COMPANY.

HARROW-DISK.

SPECIFICATION forming part of Letters Patent No. 409,818, dated August 27, 1889.

Application filed June 29, 1889. Serial No. 316,089. (No model.)

*To all whom it may concern:*

Be it known that I, JOHN T. BELL, a citizen of the United States, residing at Dayton, in the county of Montgomery and State of Ohio, have invented certain new and useful Improvements in Harrow-Disks, of which the following is a specification.

Harrow-disks have heretofore been formed either with a regular concentric periphery having a cutting-edge, or sometimes with a scalloped periphery, also concentric and having a cutting-edge, or yet with radial or quasi-radial blades or knives having one or more cutting-edges. The disks are rotated by the contact of their peripheries with the ground as the harrow is dragged thereover in the same manner as a traction-wheel, and while their object is to stir the soil and break and pulverize clods their efficiency depends mainly upon the superimposed weight of the harrow-frame. When the periphery of the disks is described upon and coincides with a circle concentric with their axes, the tendency is to roll uniformly over the ground like a wheel, and their stirring and pulverizing agency is at the minimum, whether their edges are scalloped or not. When they have radial pointed spurs or appropriate blades, these seem to catch upon the ground and roll the disks as a marker-wheel, stirring the soil as they are withdrawn, but not efficiently so.

In my improvement I propose to give the periphery of the disk a polygonal outline, preferably with alternating edges of differing length, and tangential to or coinciding with arcs of varying diameters described from the axis of said disk, thereby causing a jarring or jerky movement to the whole harrow as the disks turn from one face to another, and giving, as it were, a succession of blows to the soil.

Figure 1:
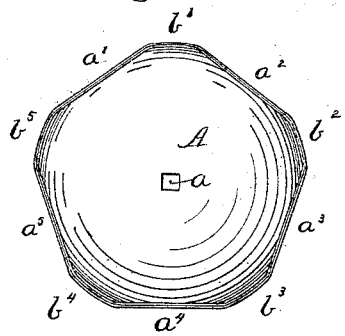
Figure 2:
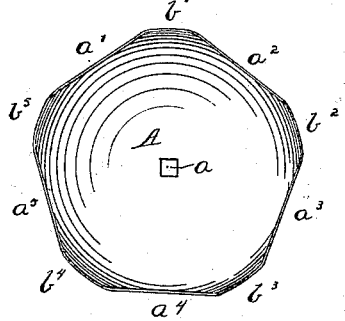
Figure 3:
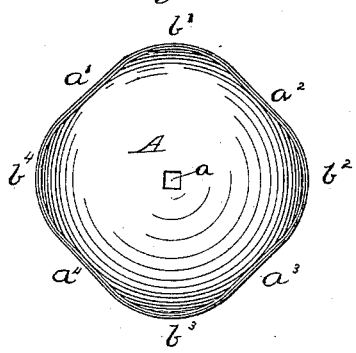
Figure 6:
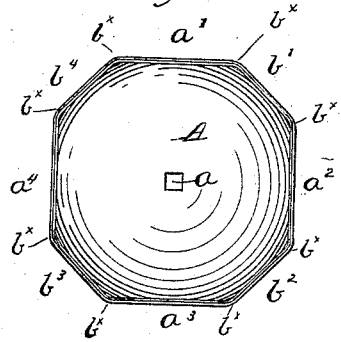
Figure 4:
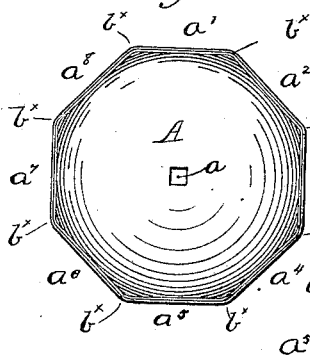
Figures 5, 7:
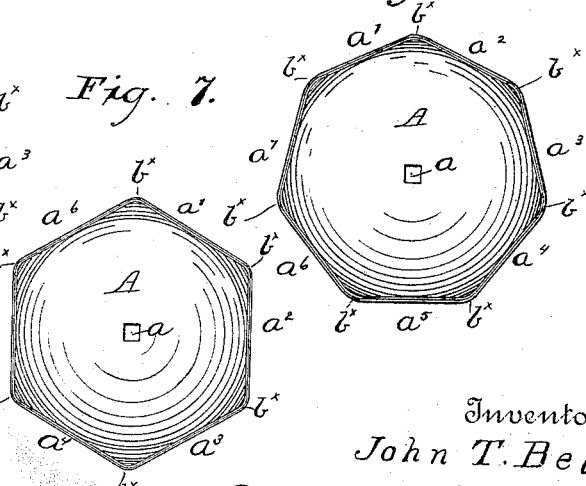

In the drawings, Figure 1 represents the convex and Fig. 2 the concave side of the preferable form of my improved harrow-disk, showing five straight cutting-edges alternating with five shorter curved cutting-edges, the straight edges touching at their centers a circle described from the axis of the disk upon a shorter radius than the one coinciding with the curved edges. In Fig. 3 a disk is shown with four straight edges alternating with four shorter curved edges described upon an arc greater than that which touches the centers of the straight edges. Fig. 4 represents a disk with eight straight edges, which may or may not be of the same length; Fig. 5, a disk with seven straight edges; Fig. 6, a disk with four long straight edges alternating with four short straight edges, and Fig. 7 a disk with six straight edges.

In all the figures, A represents the disk, and $a$ is the square aperture therein, by which said disk is secured to its shaft or to its center box or the bearing which takes over said shaft. In the construction represented by Figs. 1 and 2 the disk may be assumed to be originally a circle described upon an arc by the longest radius therein, and that from this circle five segments have been removed, leaving five straight reaches with cutting-edges, (represented by the reference-letters from $a'$ to $a^5$,) and leaving intact the short curved reaches (represented by reference-letters from $b'$ to $b^5$) corresponding with the untouched portions of the periphery of the disk. Thus it will be seen that the five straight cutting-edges, which are perpendicular to a short radius let fall upon their centers, will alternate with the five curved cutting-edges described upon longer radius, and therefore outsetting beyond the straight edges, and that the disk as it rolls over the ground will tend to tumble from the curved to the straight edges, and then rise again to the succeeding curved edge. Thus it will give a succession of blows to the soil as it rotates. A series of such disks in the harrow-gang, if turning independently, will repeat and multiply such blows indefinitely, so that the harrow will be kept in a constant jar.

While I have so far found the just-described construction the most advantageous in practice, I do not limit myself to any precise number of alternating edges, except that I consider it inadvisable to have a lesser number than four straight edges alternating with four curved or straight edges touching a longer radius, and also that if a greater number than eight straight edges alternating with shorter connecting-edges is used the disk will become so nearly round that the tumbling or jarring effect, which it is my object to secure, will be in a great degree lost. In Fig. 3, therefore, I have shown a disk having four straight edges, (indicated by reference-letters from $a'$ to $a^4$,) and perpendicular to radii let fall upon their centers, alternating with four curved edges $b'$ to $b^4$ described upon longer radii, while in Fig. 4 I have shown a disk having eight straight edges, (indicated by the reference-letters from $a'$ to $a^8$,) and connected at their points of intersection by extremely short curves $b^\times$, which are of no appreciable length. The construction represented in Fig. 5 has seven straight edges, (represented by the reference-letters from $a'$ to $a^7$,) and, like that in the preceding figure, these straight edges are connected by very short curved reaches $b^\times$ at their points of intersection. In both Figs. 4 and 5 the straight reaches are or may be of practically the same length; but in the construction shown in Fig. 6 is shown a series of long straight reaches from $a'$ to $a^4$, connected by shorter straight reaches $b'$ to $b^4$, the longer reaches being perpendicular to the shortest radii of the disk, the shorter straight reaches being perpendicular to the longer radii, and the short curves $b^\times$ at their intersection of the long and short reaches being upon still shorter radii. Finally, in Fig. 7 a disk is shown with six straight reaches of substantially equal length, (indicated by reference-letters $a'$ to $a^6$,) and with the intersecting angles connected by curves $b^\times$ of inappreciable length.

It will be understood from this description that I do not propose to confine myself to the employment of straight reaches alternating with curved reaches of shorter length in the periphery of the disk, but that I may use either straight reaches and curved reaches of equal length, or straight reaches alternating with other straight reaches of equal or unequal length in the whole periphery, connected by practically rounded angles.

What, therefore, I claim as my invention, and desire to secure by Letters Patent, is—

1. A harrow-disk having a polygonal outline with cutting-edges along the periphery.

2. A harrow-disk having a polygonal outline with alternating reaches of varying length.

3. A harrow-disk having a polygonal outline with alternating reaches touching radii of varying length.

4. A harrow-disk of a polygonal outline having straight reaches united at their intersection by curves.

5. A harrow-disk having a polygonal outline with alternating straight and curved reaches, the latter touching longer radii than the straight reaches.

6. A harrow-disk, substantially as described, having peripheral straight reaches perpendicular at their centers to short radii and united by curved reaches described upon longer radii, both straight and curved reaches having cutting-edges.

JOHN T. BELL.

Witnesses:
ALLEN E. THOMAS,
W. D. GRAVES.